United States Patent Office 3,437,007
Patented Apr. 8, 1969

3,437,007
CONTROL ARRANGEMENTS FOR AUTOMATIC
CUTTING MACHINES
Alfred Schmermund, 62 Kornerstrasse,
Gevelsberg, Westphalia, Germany
Filed Oct. 12, 1966, Ser. No. 586,244
Claims priority, application Great Britain, Oct. 22, 1965,
44,724/65
Int. Cl. B23c 1/16, 1/18
U.S. Cl. 90—13.9                                      10 Claims The invention relates to control arrangements for automatic cutting machines for providing curves on workpieces.

It is known to copy each curve to be cut on or into a workpiece from an original curve, which controls the operation of a cutting machine. With known arrangements each particular shape of curve to be cut requires an original of such particular shape.

It is an object of this invention to provide an arrangement, wherein a plurality of different curves can be cut on or into a workpiece while using the same original curve.

The present invention consists in a control arrangement for an automatic machine tool, the arrangement comprising means for sensing the shape of an original curve, distorting means, and means for exerting a control effect on a tool head of a machine tool, the control effect being dependent on the shape of the original curve sensed and on a predetermined distortion caused by the distorting means.

Figure 1:
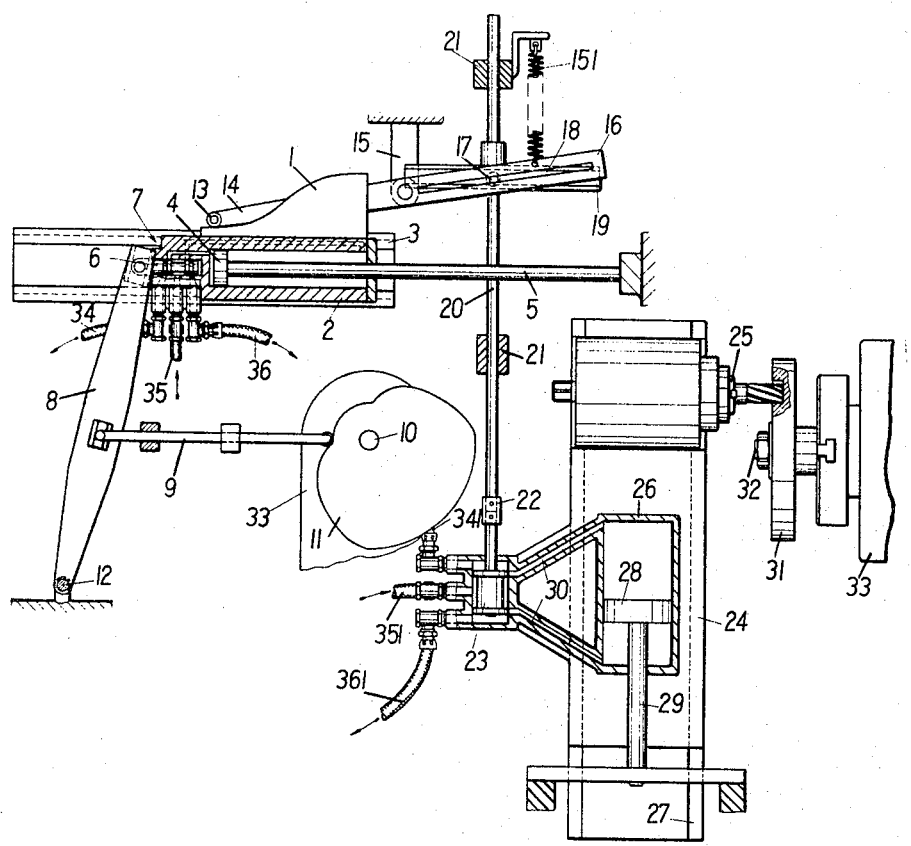
Figure 2:
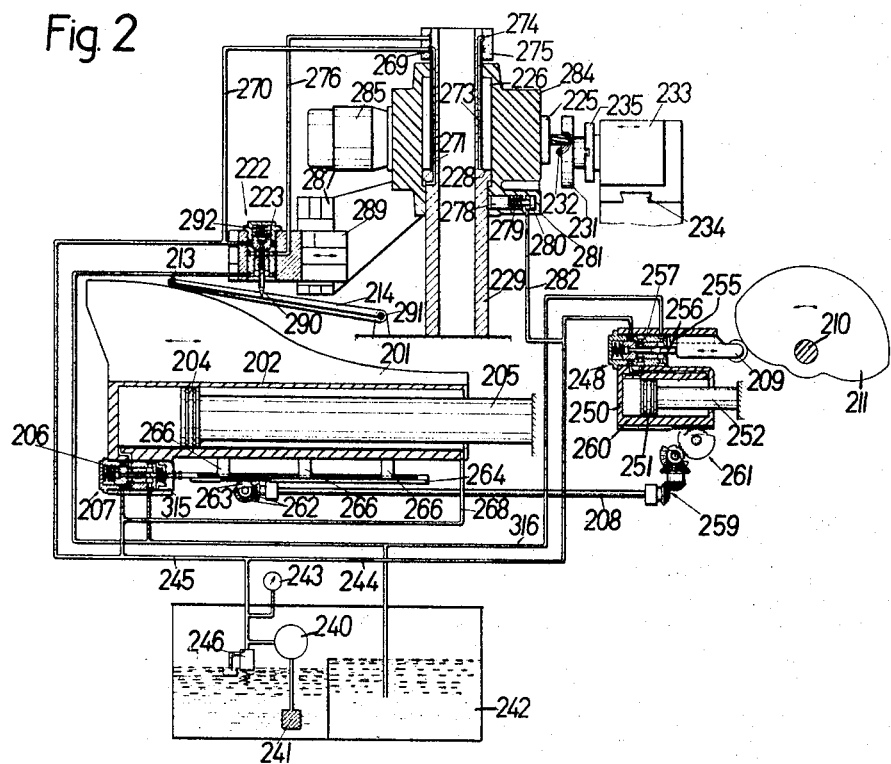
Figure 3:
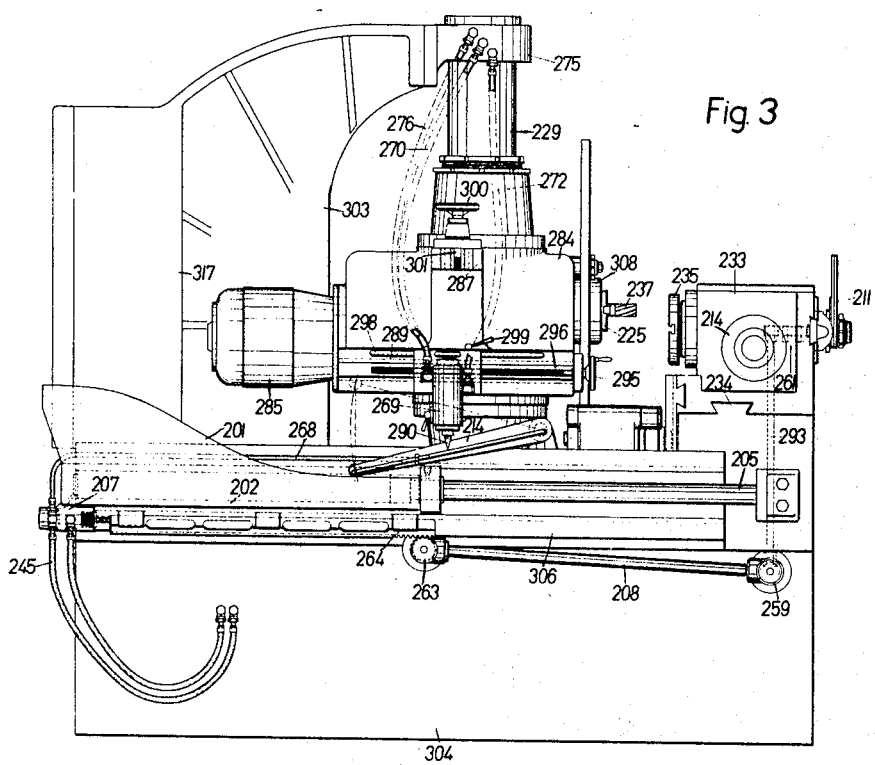
Figure 4:
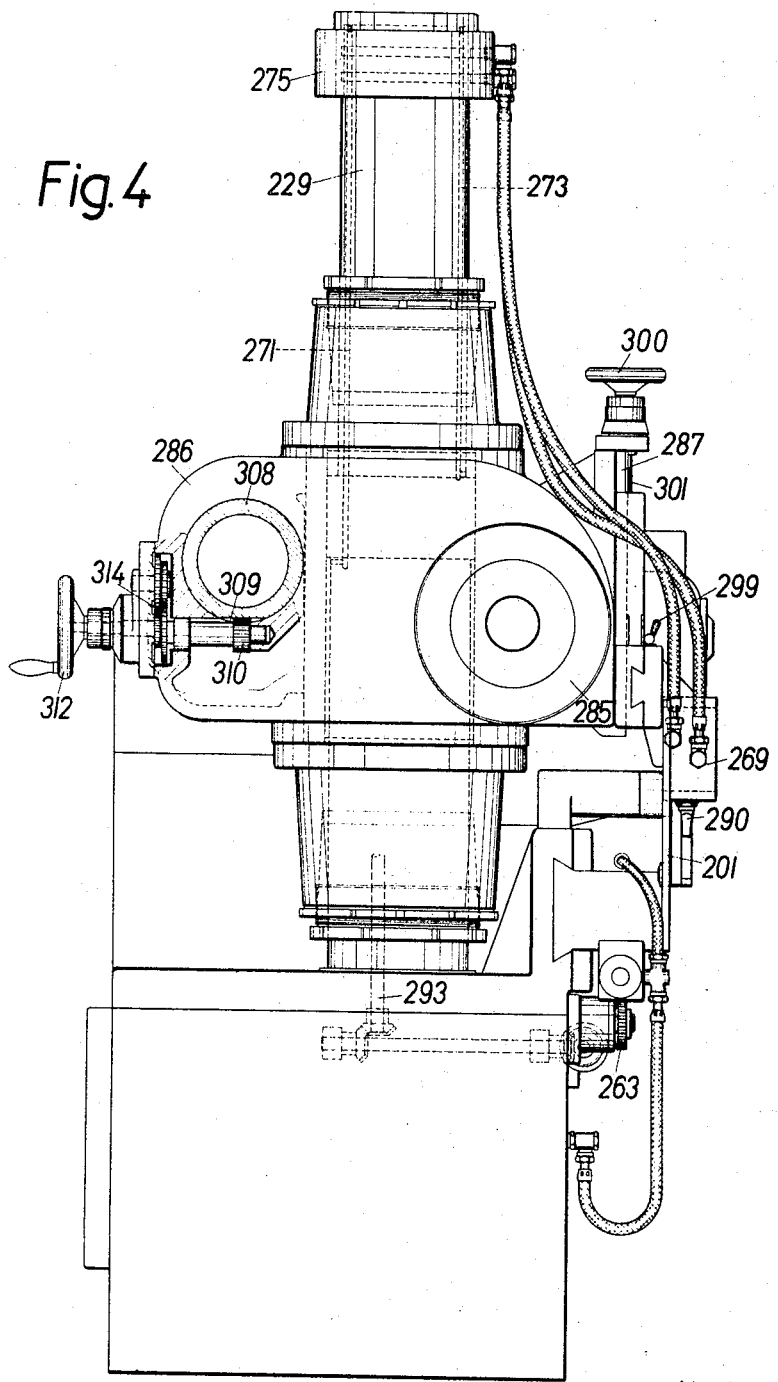

These and other objects and advantages of the invention will become apparent from a detailed description of two embodiments of the invention, reference being made to the accompanying drawings which are given by way of example and in which:

FIG. 1 illustrates a section through a first embodiment of the invention;

FIG. 2 which is somewhat diagrammatical, illustrates a section through a second embodiment of the invention;

FIG. 3 is a more detailed view of the embodiment of FIG. 2, some parts shown in FIG. 2 being omitted; and FIG. 4 is a view of the embodiment of FIGS. 2 and 3 taken at right angles to the view of FIG. 2.

The embodiment of FIG. 1 comprises a hydraulic cylinder 2 arranged for carrying an original curve 1 in the form of a translating cam. The size of the curve 1 relative to the other parts of the arrangement is preferably larger than shown. The cylinder 2 is slidable in a guide 3 by means of a stationary piston 4 on a piston rod 5 mounted to a frame of the arrangement. A liquid, for example oil, is supplied under pressure to the cylinder 2 through a control valve generally indicated by reference numeral 7, the liquid being fed in through a pressure line 35 and removed through lines 34 and 36, the liquid flow being indicated by arrows. The operation of the valve, and thereby the movement of the cylinder 2 and of the original curve 1, are determined by a plunger 6 operable by means of a lever 8 pivoted to the frame at 12 and an arm 9 carrying a follower roller co-operating with a control cam 11 fixed to a shaft 10. It will be recognized that the control cam 11, on rotation, determines the movement of the original curve 1. The control cam 11 is preferably in the general shape of an Archimedean spiral but is provided with dwell and rising portions. The control cam 11 has to be adapted to the specific requirements of each case. However, the shape of the control cam 11 is simple so that the control cam 11 is easy to make.

A shaft 32 is arranged for carrying and rotating a workpiece 31, the shaft 32 being mounted in a head 33. The shaft 10 is a continuation of the shaft 32 in the direction away from the workpiece 31. Thus the control cam 11 rotates synchronously with the workpiece 31. The original curve 1 is sensed by a follower 13 in the form of a roller. The follower 13 is carried at the end of one arm of a double-armed lever 14 pivotally mounted on a stationary support 15 and biased by a tension spring 151. The other lever arm 16 of the lever 14 carries a roller 17 displaceably mounted on the lever arm 16 and slidable in a slot 18 in the lever arm 16. The roller 17 can be fixed to the lever arm 16 in any selected position. The roller 17 is also slidable in another slot in a bar 19 fixed to a rod 20 which is slidably mounted in stationary bearings 21. Thereby, rotational movement of the lever arm 16 is converted into a rectilinear displacement of the rod 20. By displacing the roller 17 along the lever arm 16 the relationship of rotational movement of the lever arm 16 to the rectilinear displacement of the rod 20 can be altered.

The rod 20 is connected by a connecting member 22 to a plunger 23 of a control valve of an automatically operable hydraulic milling machine.

A milling head 25 of the milling machine is mounted on a slide 24 on which also is mounted a hydraulic cylinder 26 having a piston 28 on a piston rod 29 fixed to the frame of the arrangement. The slide 24 is slidable along a guide 27 so that the slide 24 can move in known manner jointly with the cylinder 26 and the milling head 25. A liquid, for example oil, is fed under pressure to and removed from the cylinder 26 through ducts 30 by means of the plunger 23 of the control valve, the liquid being supplied to the valve through a channel 351 and removed therefrom through channels 341 and 361.

In operation, the curve to be milled into the workpiece 31 is determined by the displacement of the original curve in dependence on the control cam 11 and by the setting of the roller 17 along the lever arm 16.

It will be recognized that any one of a plurality of different curves can be milled into the workpiece 31 by using a single original curve 1. Only the control cam 11, which is easy to make, may have to be changed for different curves to be milled, whereas the original curve 1, which in general is difficult to make, may be used for milling any one of the plurality of different curves into the workpiece. Furthermore, the arrangement described makes it possible to employ a comparatively large original curve 1 (which may be 1000 millimetres long or more) and to mill a comparatively small curve into the workpiece 31. Thereby any error in the original curve 1 is correspondingly reduced and, thus, the accuracy required when making the original curve 1 is comparatively small. Again, the pressure exerted by the follower 13 against the original curve 1 may be small and thereby wear and tear of the original curve 1 may be kept small.

The embodiment of FIGS. 2, 3 and 4 comprises an original curve 201 in the form of a translating cam mounted on a hydraulic cylinder 202 which is slidable on a stationary piston 204 carried on a piston rod 205 fixed to a machine frame. A plunger 206 of a control valve generally indicated by reference numeral 207 controls the flow of a hydraulic liquid to one end of the hydraulic cylinder 202 in response to rotation of a shaft 208, such rotation being initiated by movement of a cam follower 209 co-operating with a cam 211 carried on and rotatable by a shaft 210.

A cam follower 213 on one end of a single-armed lever 214 co-operates with the original curve 201 forming the cam surface of a translating cam for actuating a control valve generally indicated by reference numeral 222. The control valve 222 has a plunger 223 and controls movement of a tool holder 225 by controlling the flow of hydraulic liquid to a cylinder space 226. An annular collar 228 on a post 229 is disposed in the cylinder space 226 and forms a stationary piston.

A hydraulic pump 240 has its inlet connected to a filter 241 in a reservoir 242 for the hydraulic liquid. The pump output is connected to a pressure relief valve 246, a pressure gauge 243, and pressure lines 244 and 245. The pressure line 244 supplies hydraulic liquid to a control valve generally indicated by reference numeral 248; the control valve 248 is linked to the cam follower 209 and is connected to a movable hydraulic cylinder 250. The hydraulic cylinder 250 is carried on a piston 251 on one end of a piston rod 252, the other end of which is fixed to the machine frame. The cam follower 209 is movable on a slide 255 relative to the control valve 246 and, by means of a tapered pin 256, controls a slidable plunger 257 in the control valve 248, which in turn controls the supply of hydraulic liquid to the hydraulic cylinder 250.

The hydraulic cylinder 250 is formed with a straight toothing 260 linked through gear train 261, a shaft 293 (FIG. 3) and a bevel gear arrangement 259 to one end of the shaft 208. The opposite end of the shaft 208 is linked through bevel gear arrangement 262 and a spur gear wheel 263 to a rack 264 slidably carried by supports 266 projecting from the hydraulic cylinder 202 for actuating the plunger 206 of the control valve 207.

The pressure line 245 communicates under the control of the control valve 207 with one end of the hydraulic cylinder 202 and through a pressure line 268 with the other end of the hydraulic cylinder 202. The pressure line 245 is also connected to the control valve 222 and through a pressure line 270, an annular duct 269 in a bush 275 on the post 229 and a duct 271 in the post 229 to the portion of the hydraulic cylinder space 226 disposed beneath the annular collar 228. A further duct 273 in the post 229 connects the portion of the hydraulic cylinder space 226 above the annular collar 228 through an annular duct 274 in the bush 275 and a pressure line 276 with the control valve 222. A brake member 278 urged by a spring 279 towards the post 229 is connected to a piston 280 in a cylinder 281 which is connected by a pressure line 282 to the pressure line 244 so that the brake member 278 can be retracted against the action of the compression spring 279 by the pressure of hydraulic liquid in the cylinder 281.

The cylinder space 226 is provided in a tool head 284 carrying an electric motor 285 for driving the tool holder 225. A guide 287 secured to the tool head 284 carries a slide 289 which in turn carries the control valve 222, the control valve 222 being slidable on the slide 289 in the direction perpendicular to the direction in which the tool head is slidable in the guide 287. Thereby, the control valve 222 is adjustable in position in two directions perpendicular to each other. A pin 290 projecting from a casing 269 of the control valve 222 (FIGS. 3 and 4) rests on the lever 214. The plunger 223 of the valve 222 is urged by spring means 292 against the pin 290, the plunger 223 and the pin 290 moving against the action of the spring means 292 when the lever 214 pivots in a clockwise direction as viewed in FIG. 2 about a fulcrum 291 on the machine frame.

The shaft 293 shown in broken lines in FIG. 3 is telescopic and is connected at opposite ends through universal joints (not shown) to the gear arrangement 261 and the bevel gear wheels 259 to allow adjustment perpendicular to the plane of FIG. 3 of a workpiece head 233 on a slide 234. By this movement of the workpiece head 233 the relative positions of the axes of rotation of a workpiece holder 235 on the workpiece head 233 and of the tool holder 225, which carries a milling cutter 237, is adjustable.

A handwheel 295 (FIG. 3) fixed to a worm 296 is provided for adjusting the control valve casing 269 horizontally along the slide 289 and thereby adjusting the pin 290 along the lever 214, the position of the control valve casing 269 and the pin 290 being indicated on a scale 298 of the slide 289. A locking lever 299 is provided for locking the control valve casing 269 and therewith the pin 290 in position on the slide 289. A further handwheel 300 fixed to a worm 301 is provided for adjustment of the slide 289 along the guide 287. The pressure lines 276 and 270 and a return line 272 are flexible to allow for relative movement of the bush 275 and the valve casing 269.

The bush 275 is provided at the end of an overhanging portion of a column casting 303 which extends from a machine bed 304. The hydraulic cylinder 202 is slidable along a guide 306 mounted on the machine bed 304.

The tool holder 225 is carried in a longitudinally movable tubular member 308 which extends into the tool head 204 and which, as shown in FIG. 4, is provided with toothing 309 meshing with a spur gear wheel 310. A handwheel 312 is connected through a reduction gear train 314 to the spur gear 310 for moving the tubular member 308 longitudinally relative to the tool head 284 and thereby longitudinally adjusting the milling cutter 237 towards and away from a workpiece 231 (FIG. 2) on the workpiece holder 235. A tool spindle (not shown) driven by the electric motor 285 is carried on conical roller bearings in the tubular member 308 and carries the tool holder 225. The workpiece holder 235 is driven by a flange-mounted electric motor 214 secured to the workpiece head 233 and drives the shaft 210 (FIG. 2) carrying the cam 211, the shaft 210 carrying also the workpiece holder 235. The cam 211 may be made in one piece or may be formed by a plurality of segments connected together and, as in the embodiment of FIG. 1, the periphery of the cam 211 has portions having the shape of Archimedean spirals with dwell and rising portions.

As shown in FIG. 2, the control valve 206 contains a compression spring 315 which exerts a force on the rack 264. This force is transmitted by the rack 264 to the gears 262 and 263, the shaft 208, the bevel gear wheels 259, the shaft 293 and the gear arrangement 261 to the hydraulic cylinder 250 for taking up any play in the toothings of these gears.

A liquid line 316 for the return flow of hydraulic fluid to the reservoir 242 is connected to the control valves 207, 248 and 222 (FIG. 2).

A housing 317 (FIG. 3) on the column casting 303 contains motor starters, fuses, and speed control devices for controlling the electric motors 285 and 214. A potentiometer (not shown) may be provided which is adjusted by movement in one direction of the tool head 284 and thus of the milling cutter 237 and which serves to correct the speed of rotation of the workpiece holder 235 so that this speed is reduced when the speed of movement in said one direction of the milling cutter 237 is increased.

The operation of the embodiment of FIGS. 2, 3 and 4 is as follows:

The cam 211 is adjusted on the shaft 210 so that the cam follower 209 contacts the highest portion of the cam 211 and the handwheel 295 is adjusted to move the pin 290 into the required position on the lever 214, the position being indicated on the scale 298. The handwheel 300 is rotated to raise or lower the milling cutter 237. The workpiece support head 233 is then adjusted on the guide 234, a scale (not shown) being provided for bringing this adjustment into agreement with the adjustment read from the scale 298. The workpiece 231 is fitted to the workpiece holder 235 and the speed of rotation of the milling cutter 237 is adjusted. The electric motors 285 and 214 are energized and, by means of the handwheel 312, the milling cutter 237 is fed forward to the workpiece 231.

The rotation of the cam 211 operates the cam follower 209 to actuate the control valve 248. Hydraulic liquid is supplied under pressure by the pump 240 from the reservoir 242 through the pressure line 244 to the control valve 248 and, on displacement, by the cam follower 209, of the plunger 257 to the left as viewed in FIG. 2, enters both ends of the hydraulic cylinder 250. Owing to the difference in the areas of the end walls of the hydraulic cylinder 250, the hydraulic cylinder 250 is displaced and this movement is transmitted through the gear arrangement 261, the shaft 293, the bevel gear wheels 259, the shaft 208, the bevel gear wheels 262, the gear arrangement 263 and the rack 264 to the control valve 207, which is actuated to cause longitudinal movement of the hydraulic cylinder 202. The original curve 201 moves with the hydraulic cylinder 202 and pivots the lever 214, thus actuating the control valve 222 through the pin 290. The actuation of the control valve 222 controls the flow of hydraulic liquid through the pressure line 276, the annular duct 274 and the duct 273 into the portion of the hydraulic cylinder space 226 above the annular collar 228, which causes the tool head 284 to be raised on the post 229.

If the pressure in the pressure lines 244 and 282 falls below a predetermined value, the pressure acting on the piston 280 likewise falls and is insufficient to retain the brake member 278 against the action of the spring 279, so that the brake member 278 is urged against the post 229 and prevents the tool head 284 from falling down the post 229.

It will be appreciated that, again, the action of the original curve 201 on the cam follower 213 is distorted by the auxiliary cam 211 which controls the speed of movement of the original curve 201 relative to the cam 213, and further by the lever arm 214 which depending of the position of the pin 290 varies the ratio of movement of the follower 213 to movement of the pin 290 which in turn operates the control valve 222 for moving the tool 237 relative to the workpiece 231. However, whereas the link between the auxiliary cam 11 and cylinder 2 carrying the original curve 1 of the embodiment of FIG. 1 is mechanical, the corresponding link between the auxiliary cam 211 and the cylinder 202 of the embodiment of FIGS. 2, 3 and 4 is partly mechanical and partly hydraulic.

It should be clearly understood that the specific embodiments described and illustrated are given by way of example. Modifications are possible without departing from the scope and spirit of the invention.

I claim:

1. A control arrangement for an automatic machine tool comprising a movable carrier, an original curve member mounted on said carrier, means sensing the shape of said curve member, means for displacing and moving said sensing means and said original curve member relative to each other, means remote from said curve member and sensing means influencing the relative movement therebetween, control means in association with said curve member and sensing means for controlling the movement of a machine tool head, means linking said influencing means with said curve member and sensing means, said influencing means being capable of varying the speed of relative movement of said sensing means and said original curve member, said control means including a movable control member, means for selectively positioning said control means whereby the ratio of movement of said sensing means and movement of said control member can be varied.

2. An arrangement as defined in claim 1, wherein said sensing means comprise a follower arranged for cooperation with said original curve member.

3. An arrangement as defined in claim 1, wherein said influencing means comprise a cam, an auxiliary follower arranged for cooperation with said cam, and means for rotating said cam with a workpiece.

4. An arrangement as defined in claim 1, wherein said positioning means comprises a lever.

5. An arrangement as defined in claim 4, wherein said lever is a double-armed lever.

6. An arrangement as defined in claim 4, wherein said lever is a single-armed lever.

7. An arrangement as defined in claim 1, wherein said linking means comprise a lever mechanically linked to said auxiliary follower, and a hydraulic valve controlled by said lever, said valve being arranged for hydraulically controlling movement of said original curve member relatively to said follower cooperating with said original curve member.

8. An arrangement as defined in claim 1, wherein said linking comprise a first hydraulic valve controllable by said auxiliary follower, a first movable cylinder and stationary piston arrangement, said cylinder being hydraulically movable under the control of said first valve, a second hydraulic valve, a rack on said first cylinder for mechanically linking said first cylinder to said second valve to operate the same in dependence on movement of said first cylinder, a second movable cylinder and stationary piston arrangement, said second movable cylinder constituting said carrier for said original curve member and being hydraulically displaceable under the control of said second valve.

9. An arrangement as defined in claim 8, wherein said control means comprise a third hydraulic valve arranged for hydraulically displacing said tool head, said third hydraulic valve including said control member in the form of a plunger-pin, a lever carrying said follower cooperating with said original curve member, said plunger pin bearing against said lever for controlling said third valve in dependence on movement of said follower on said lever, and means for displacing said plunger-pin along said lever for varying the ratio of the movements of said follower and said plunger-pin.

10. An automatic cutting machine for providing a curve on a workpiece, comprising a first holder for holding a cutting tool, a second holder for holding a workpiece to be cut by said tool, a rotatable shaft carrying said second holder, a rectilinearly movable carrier for an original curve, a first follower arranged for sensing said original curve, a rotatable cam fixed to said shaft, a second follower arranged for cooperation with said cam, means linking said second follower to said carrier for controlling during each revolution of said second holder the speed of movement of said carrier in dependence on the shape of said cam, a lever carrying said first follower, means cooperating with and displaceable by said lever and linked to said tool holder for controlling the operation of said cutting tool, and means moving said cooperating means relative to said lever for altering the ratio of movement of said first follower and displacement of said cooperating means.

References Cited

UNITED STATES PATENTS

| 1,406,866 | 2/1922 | Horn | 90—13.9 |
| 2,806,330 | 9/1957 | Musyl | 90—13.9 |

ANDREW R. JUHASZ, *Primary Examiner.*

G. WEIDENFELD, *Assistant Examiner.*

U.S. Cl. X.R.

90—13.5